(12) United States Patent
Jaensch

(10) Patent No.: US 8,434,262 B2
(45) Date of Patent: May 7, 2013

(54) PLANT ARRANGEMENT

(75) Inventor: Peter Jaensch, Nürnberg (DE)

(73) Assignee: Geobra Brandstatter GmbH & Co. KG, Zimdorf (DE)

( * ) Notice: Subject to any disclaimer, the term of this patent is extended or adjusted under 35 U.S.C. 154(b) by 217 days.

(21) Appl. No.: 13/104,527

(22) Filed: May 10, 2011

(65) Prior Publication Data

US 2011/0283614 A1 Nov. 24, 2011

(30) Foreign Application Priority Data

May 20, 2010 (DE) .......................... 10 2010 029 172

(51) Int. Cl.
*A01G 9/02* (2006.01)

(52) U.S. Cl.
USPC ........................................................ 47/66.1

(58) Field of Classification Search .................. 47/59 R, 47/62 N, 62 R, 66.1, 66.6, 68, 70, 79, 83, 47/85, 86
See application file for complete search history.

(56) References Cited

U.S. PATENT DOCUMENTS

| | | | | |
|---|---|---|---|---|
| 2,016,732 A | * | 10/1935 | Thompson ......................... | 47/47 |
| D145,917 S | * | 11/1946 | Ames ........................... | D11/145 |
| 2,463,719 A | * | 3/1949 | Schackett et al. .................. | 47/75 |
| 2,805,277 A | * | 9/1957 | Moeller ..................... | 174/161 R |
| 2,851,823 A | * | 9/1958 | Peterson ........................... | 47/47 |
| 2,968,850 A | * | 1/1961 | Tinnerman ..................... | 403/397 |
| 3,026,649 A | * | 3/1962 | Barakauskas ..................... | 47/70 |
| 4,040,208 A | * | 8/1977 | England .............................. | 47/67 |
| 5,269,094 A | * | 12/1993 | Wolverton et al. ............ | 47/66.6 |
| 5,444,940 A | * | 8/1995 | White-Wexler et al. .......... | 47/82 |
| 6,247,553 B1 | * | 6/2001 | Jones .............................. | 182/92 |
| 7,426,802 B2 | * | 9/2008 | Umbaugh, Jr. ................ | 47/62 R |
| 2008/0250712 A1 | * | 10/2008 | DiPaolo et al. ................... | 47/79 |
| 2008/0313960 A1 | * | 12/2008 | Norvitch ........................... | 47/79 |
| 2010/0186295 A1 | * | 7/2010 | Rodrigues ...................... | 47/65.6 |
| 2011/0283614 A1 | * | 11/2011 | Jaensch .......................... | 47/66.1 |

FOREIGN PATENT DOCUMENTS

| | | | | |
|---|---|---|---|---|
| DE | 10350369 | | 5/2005 | |
| FR | 2668128 A1 | * | 4/1992 | ..................... 47/66.1 |
| GB | 2035027 A | * | 6/1980 | ..................... 47/70 |
| JP | 3147613 U | * | 1/2009 | |
| JP | 4730854 B1 | * | 7/2011 | |
| JP | 2011130757 A | * | 7/2011 | |

OTHER PUBLICATIONS

English Abstract of DE 10350369.

* cited by examiner

*Primary Examiner* — Frank T Palo

(74) *Attorney, Agent, or Firm* — James B. Conte; Husch Blackwell LLP

(57) ABSTRACT

A plant arrangement for plants, in particular for pot plants with tendrillar shoots, comprises a base body surrounding an interior with at least one plant pot receptacle, a plant pot arranged in the at least one plant pot receptacle with a plant pot interior surrounded by the plant pot to receive a plant and a plant pot opening to insert the plant in the plant pot interior, at least one substantially vertically extending holding element, which is fastened to the base body, and at least one substantially horizontally extending climbing aid for the plant, wherein the at least one climbing aid has a spring unit, which can be transferred by actuation from a fastening position into a displacement position, wherein the at least one climbing aid is clamped on the holding element in the non-actuated fastening position of the spring unit, and wherein the at least one climbing aid can be displaced along the holding element in the actuated displacement position of the spring unit.

18 Claims, 5 Drawing Sheets

PLANT ARRANGEMENT

CROSS-REFERENCES TO RELATED APPLICATIONS

This application claims the priority of German Patent Application, Serial No. 10 2010 029 172.2, filed May 20, 2010, pursuant to 35 U.S.C. 119(a)-(d), the content of which is incorporated herein by reference in its entirety as if fully set forth herein.

FIELD OF THE INVENTION

The invention relates to a plant arrangement for plants, in particular for pot plants with tendrillar shoots.

BACKGROUND OF THE INVENTION

Plant arrangements of this type have been known for a long time through public prior use.

SUMMARY OF THE INVENTION

An object of the invention is to further develop a plant arrangement in such a way that its handling is simplified.

The object is achieved by a plant arrangement for plants, in particular for pot plants with tendrillar shoots, wherein the plant arrangement comprises a base body surrounding an interior with at least one plant pot receptacle, a plant pot arranged in the at least one plant pot receptacle with a plant pot interior surrounded by the plant pot for receiving a plant and a plant pot opening for inserting the plant in the plant pot interior, at least one substantially vertically extending holding element, which is fastened to the base body, and at least one substantially horizontally extending climbing aid for the plant, wherein the at least one climbing aid has a spring unit, which can be transferred by actuation from a fastening position into a displacement position, wherein the at least one climbing aid is clamped on the holding element in the non-actuated fastening position of the spring unit, and wherein the at least one climbing aid is displaceable along the holding element in the actuated displacement position of the spring unit.

The core of the invention is to design a plant arrangement with a climbing aid for a plant, in particular for a pot plant with tendrillar shoots, the climbing aid having a spring unit, which can be transferred by actuation from a fastening position into a displacement position. In the non-actuated fastening position of the spring unit, the climbing aid is fastened to a holding element. In the actuated displacement position of the spring unit, the climbing aid can be displaced along the holding element. The holding element extends substantially vertically and is fastened to a base body. The base body surrounds an interior and has at least one plant pot receptacle. Arranged in the plant pot receptacle is a plant pot, which surrounds a plant pot interior for receiving a plant and which has a plant pot opening for inserting the plant into the plant pot interior. The climbing aid extends substantially horizontally, preferably perpendicular to the substantially vertical holding element. The plant arrangement according to the invention therefore provides a climbing aid, which can be fastened easily and with few hand movements to the base body. With a preferably elliptical configuration of the spring unit with two spring elements, which are connected to one another rigidly and, in particular in one piece, at their ends, the climbing aid and the plant arrangement are configured as a whole in an aesthetically pleasing manner and therefore correspond to increased demands of a user. The spring unit can preferably be actuated by manually pressing together the spring elements, for example by resilient deformation. In particular, the climbing aid is steplessly height-adjustable on the holding element. For improved fastening of the climbing aid to the holding element, the spring elements may have insertion openings, on which clamping jaws with a clamping face are arranged. In the fastening position, the clamping faces then rest on the holding element, so an increased friction resistance of the climbing aid is provided relative to a vertical displacement on the holding element. In the displacement position, the clamping faces are arranged spaced apart from the holding element, so a particularly effortless displacement of the climbing aid is possible along the holding element.

Additional features and details of the invention emerge from the following description of an embodiment with the aid of the drawings.

DESCRIPTION OF A PREFERRED EMBODIMENT

Figure 1:
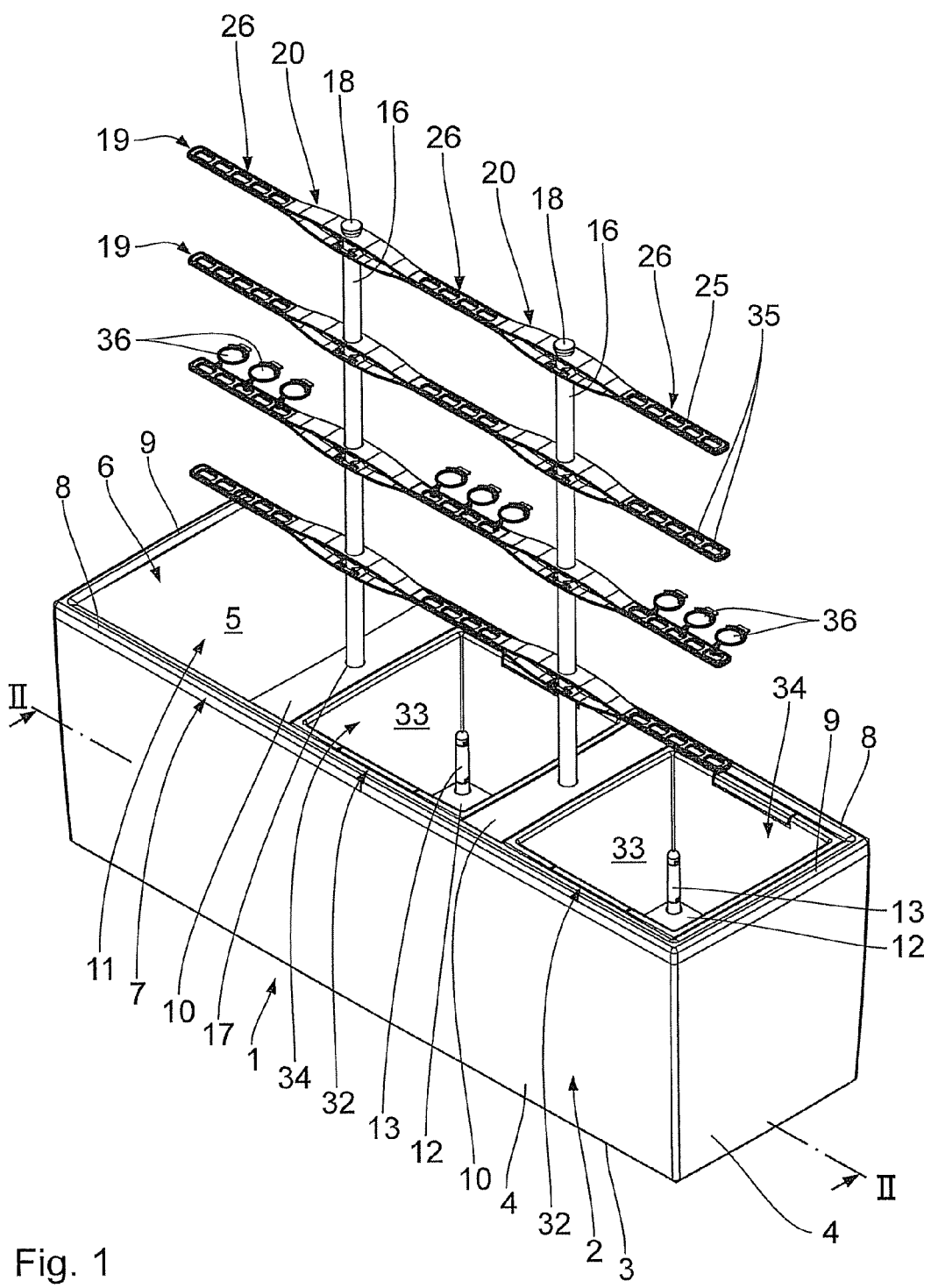
FIG. 1 shows a perspective view of a plant arrangement according to the invention in a fastening position of a climbing aid.
Figure 2:
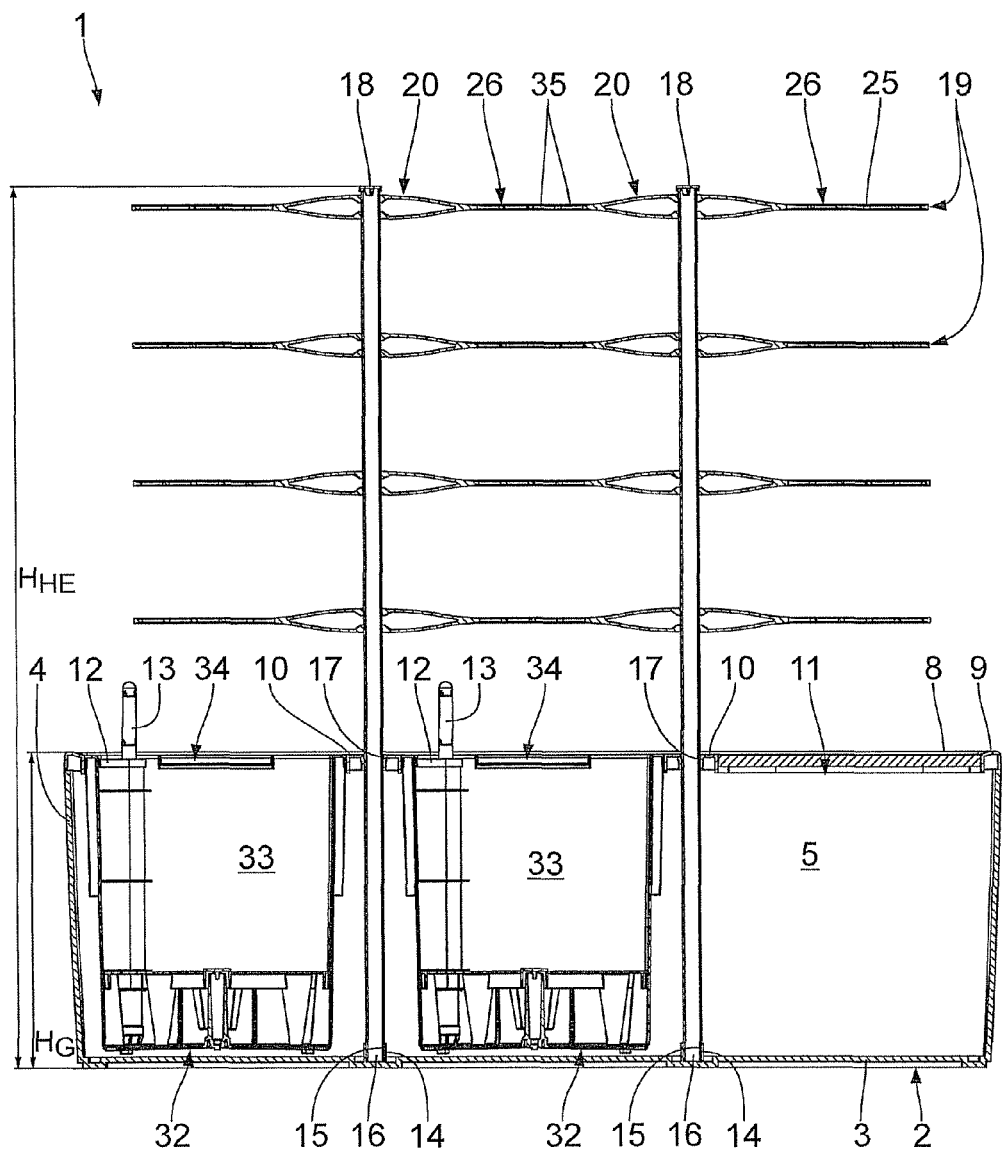
FIG. 2 shows a longitudinal section along the section line II-II in FIG. 1.

A plant arrangement 1 shown in FIGS. 1 and 2 comprises a substantially cuboid base body 2 with a rectangular base 3 and side walls 4 extending substantially vertically upwardly from the base 3. In the embodiment shown of the plant arrangement 1, the side walls 4 are conically arranged relative to the base 3 in such a way that a spacing of opposing side walls 4 is smallest at the base 3. The base body 2, i.e. the base 3 and the side walls 4 connected in one piece to the base 3, surround an interior 5, the cross sectional area of which parallel to the base 3 becomes greater with an increasing spacing from the base 3. The side walls 4 are also connected to one another in one piece. The base 3 may also have a different base shape, such as, for example, a square, a triangle, a pentagon, a hexagon, further polygonal shapes or a circle, the side walls 4 having to be correspondingly adapted.

The base body 2 has, opposing the base 3, a base body opening 6, on which a frame 7 is placed. The frame 7 is preferably latched on the side walls 4 of the base body 2 by clipping on. It is also possible to produce the frame 7 in one piece with the side walls 4, to glue the frame 7 to the side walls 4 or to connect it in another common manner to the side walls 4.

The frame 7 is correspondingly rectangular with two opposingly arranged longitudinal edges 8 and two opposingly arranged transverse edges 9. The longitudinal edges 8 and the transverse edges 9 are connected to one another in such a way that they form a closed rectangular shape. In addition, the frame 7 has two separating webs 10, which connect the opposingly arranged longitudinal edges 8 to one another. The separating webs 10 are oriented parallel to the transverse edges 9 and arranged along the longitudinal edges 8 in such a way that the base body opening 6 is divided into three plant pot receptacles 11 of equal sizes. The plant pot receptacles 11 are substantially square in each case.

It is also possible to design the frame 7 differently, so that more or less than three plant pot receptacles 11 are provided. A plant pot 32 may be arranged in a plant pot receptacle 11, the plant pot 32 surrounding a plant pot interior 33 for receiving a plant, not shown, and a plant pot opening 34 being provided for inserting the plant, in particular a pot plant with tendrillar shoots, into the plant pot interior 33. The plant pot interior 33 is separated at a lower side by a base from a water reservoir. A plurality of spacers is provided in the water reservoir, so that the plant pot 32 is spaced apart from the base 3 of the base body 2. Via a plurality of openings of the spacers, water can go from the water reservoir for watering the plant in the plant pot interior 33. The watering of the plant thus takes place indirectly via the water reservoir and not directly into the plant pot 32, the water reservoir being filled by means of a filling shaft from an upper side of the plant pot 32. This avoids the plant being supplied with too much water, in other words over-watered. The filling shaft according to the embodiment shown has a substantially square cross section, is arranged in a corner region of the plant pot 32 and separated from the plant pot interior 33. The shaft may also have other cross sectional shapes. At an upper side, the shaft is closed by an approximately square lid 12. Also provided in the shaft is a filling level display 13 with a float, not shown, the filling level display 13 being guided out from the shaft through an opening in the lid 12. The filling level display 13 is used to display and monitor a filling level with water in the water reservoir of the plant arrangement 1.

Two clamping devices 14 projecting into the interior 5 of the base body 2 extend proceeding from the base 3. Each clamping device 14 is substantially cylindrical with an inner hole 15, which may also be conical, so that a diameter of the inner hole 15 becomes smaller toward the base 3.

A holding element 16, which has an external diameter such that it is clamped in the inner hole 15 of the clamping device 14, is inserted in the inner hole 15 of the clamping device 14. The holding element 16, proceeding from the clamping device 14 arranged at the base 3, extends substantially vertically away from the base 3 and is guided through a guide hole 17 in the separating web 10. The holding element 16 has a height $H_{HE}$, which is greater than a height $H_G$ of the base body 2. When the holding element 16 is not assembled on the base body 2, the guide hole 17 in the separating web 10 is closed with a covering cap 18, so that the plant arrangement 1 also satisfies the increased visual demands of a user when used without holding elements 16.

In particular, it is thereby also possible to allow a flexible arrangement of the holding elements 16 on the base body 2, in that, for example, in the plant arrangement 1 shown in the embodiment, only one holding element 16 or no holding element 16 is provided. If a holding element 16 is provided, the covering cap 18 can be used in that one end of the holding element 16 arranged opposing the clamping device 14 is closed by the covering cap 18. As a result, on the one hand, the aesthetic design of the plant arrangement 1 is improved and simultaneously a soiling of the holding element 16 is avoided.

The holding element 16 is designed as a tube and may, for example, comprise a plurality of tube portions which can in particular be connected to one another by plug connections and/or a telescopic tube. In the embodiment shown, the holding element 16 is designed as a one-piece tube. In the embodiment shown, the plant arrangement 1 thus has three plant pot receptacles 11 for the insertion of three plant pots, one respective holding element 16 being provided between two adjacent plant pot receptacles 11 in each case.

Figure 3:
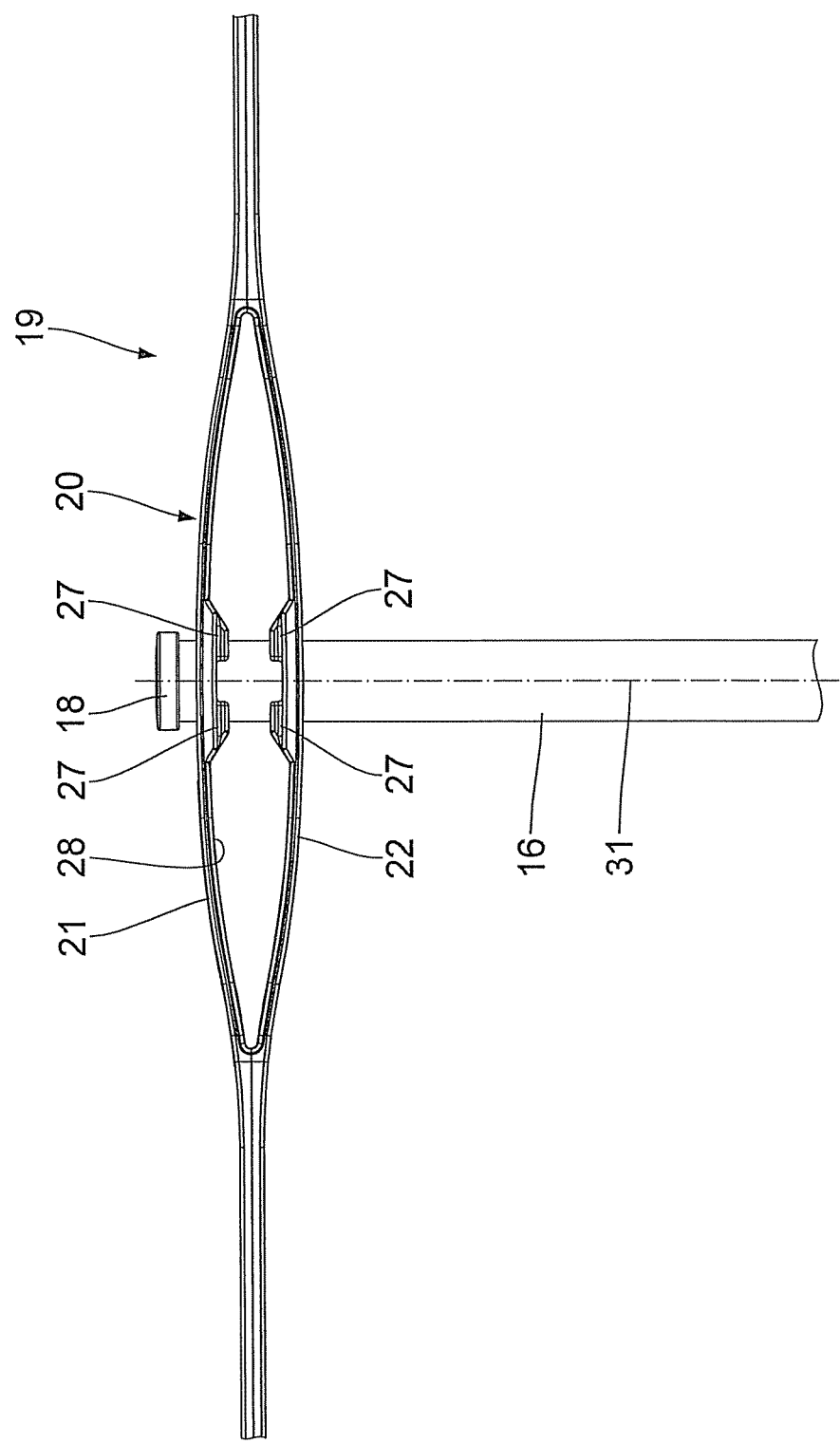
FIG. 3 shows an enlarged side view of a climbing aid fastened to a holding element.
Figure 4:
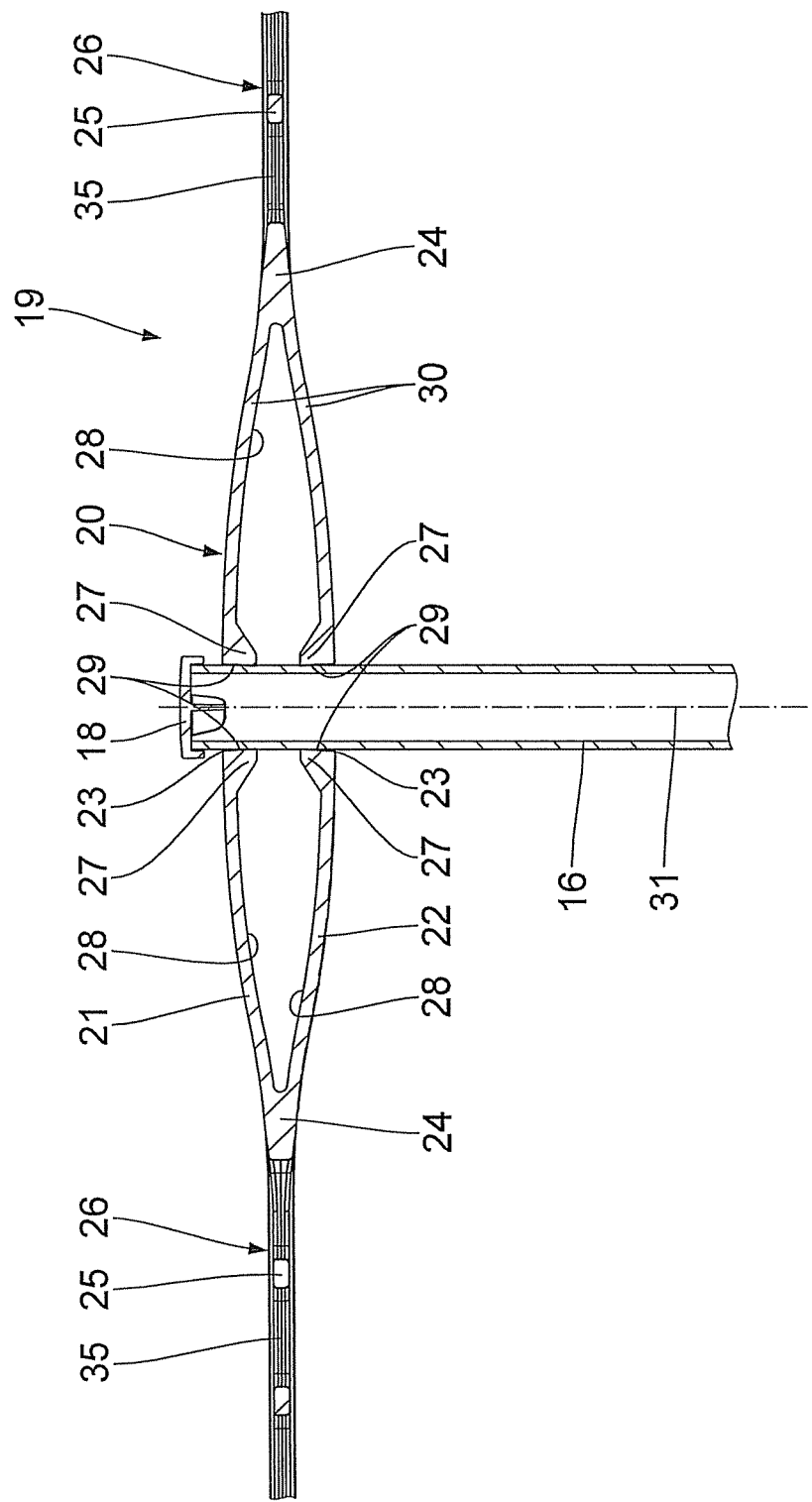
FIG. 4 shows an enlarged sectional view, corresponding to FIG. 2, of the holding element with the climbing aid
Figure 5:
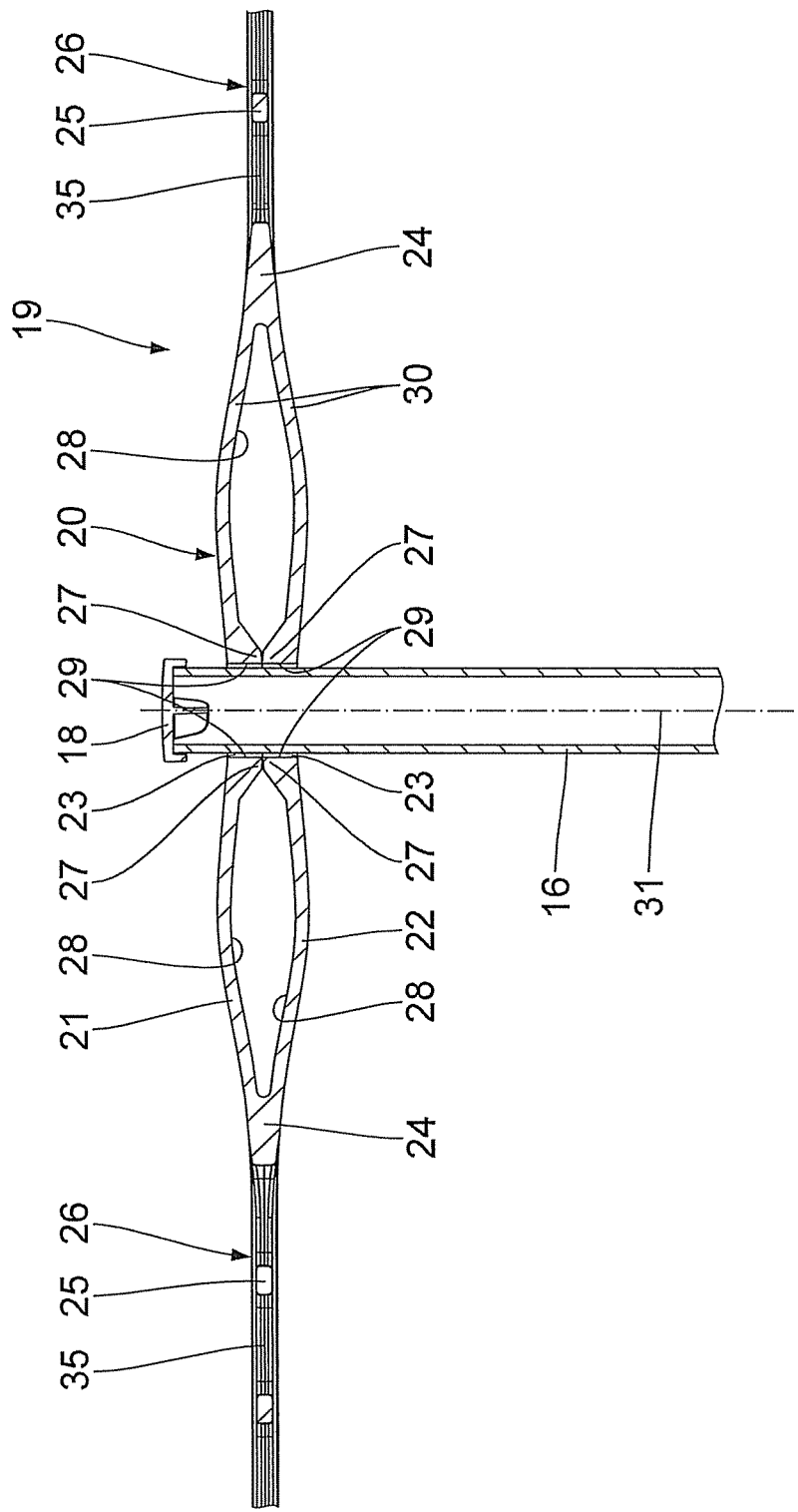
FIG. 5 shows a longitudinal section, corresponding to FIG. 4, of the climbing aid in a displacement position.

As shown in FIGS. 3 and 4, a climbing aid 19 is fastened by a spring unit 20 to the holding element 16. In this case, the spring unit 20 has an upper spring element 21 and a lower spring element 22. Provided in each case in the spring elements 21, 22 is an insertion opening 23, the insertion openings 23 being arranged spaced apart and concentrically with respect to the holding element 16. The spring elements 21, 22 substantially have the shape of a flat rod and have a bent shape. The spring elements 21, 22 are also connected in each case at their ends to one another, rigidly, and in particular in one piece. In this case, the spring elements 21, 22 are arranged mirror symmetrically in accordance with their bent shape in such a way that the spring unit 20 has an elliptical shape. Climbing arms 25 extend laterally, in each case to the side of connecting points 24 of the upper spring element 21 to the lower spring element 22. The climbing arms 25 may have a plurality of openings 35. The plant may, for example, climb directly through the openings 35 or be held on fastening eyelets 36 fastened on the openings 35. The climbing aid 19 is pushed with the insertion openings 23 of the spring unit 20 onto the holding element 16.

The climbing aid 19 is oriented substantially horizontally and therefore perpendicular to the holding element 16. According to the view shown in FIGS. 1 and 2, provided in the plant arrangement 1 are four climbing aids 19, which are vertically spaced apart at regular intervals along the holding elements 16. The climbing aids 19 may have two identical climbing elements 26, which are connected to one another to form the climbing aid 19. For this purpose, the climbing elements 26 may in each case have a latching projection and a latching recess corresponding thereto, so that the climbing elements 26 are permanently and rigidly latched to one another. Since the climbing elements 26 are identically configured, the individual component size of the climbing elements 26 is reduced and therefore the tool and production costs are reduced overall. Furthermore, mass production of a climbing element of this type is made possible, as eight identical climbing elements are used for the plant arrangement 1 shown.

According to FIGS. 1 and 2, the spring units 20 are not actuated. In this arrangement, the spring units 20 are in a fastening position. In the fastening position of the spring unit, the climbing aid 19 is clamped to the holding element 16. This takes place in that the climbing aid in each case has a pair of clamping jaws 27 at the two insertion openings 23. The clamping jaws 27 in each case have the shape of a half circular ring disc and are arranged concentrically with respect to the insertion opening 23 on the upper spring element 21 and the lower spring element 22. The clamping jaws 27 are in this case arranged on mutually facing inner sides 28 of the spring elements 21, 22 of the spring unit. This means that the clamping jaws 27 are arranged within the elliptical shape formed by the spring elements 21, 22. The clamping jaws 27 have a clamping face 29 which faces the holding element 16 with which they rest in a clamping manner on the holding element 16 in the fastening position.

In the fastening position, the clamping faces are arranged in an X-shape relative to a longitudinal axis 31 of the holding element 16, i.e. in each case, a pair of clamping jaws 27 is arranged on one of the spring elements 21, 22 in such a way that a spacing of the clamping faces 29 from the interior of the spring unit 20 is reduced. The clamping jaws 27 are in each case formed in one piece on the spring elements 21, 22.

The spring unit 20 is actuated by pressing together the spring elements 21, 22 in such a way that the spring unit 20 is resiliently deformed in such a way that a region 30 of the spring elements 21, 22, which is curved in the non-actuated state, is pressed onto the corresponding curved region 30 of the respective opposing spring element 21, 22 until the region 30 is substantially arranged perpendicular to a longitudinal axis 31 of the holding element 16.

In the non-actuated position of the spring elements 21, 22, a cross sectional area surrounded by the clamping faces 29 is smaller than a cross sectional area of the holding element 16 perpendicular to the longitudinal axis 31. As a result, the clamping jaws 27 rest in a clamping manner on the holding element 16. By actuating the spring unit 20, i.e. by pressing together the spring elements 21, 22 so that the clamping jaws 27 are moved toward one another, the spring elements 21, 22 are resiliently deformed in such a way that the regions 30 are arranged parallel to one another and vertically. Thus, the arrangement of the clamping jaws 27 around the insertion openings 23 is also correspondingly changed. In this arrangement, which is also called the displacement position of the spring unit 20, the clamping faces 29 of the clamping jaws 27 have a maximum spacing from one another and delimit a cross sectional area, which is greater than a cross sectional area of the holding element 16 perpendicular to the longitudinal axis 31. The maximum spacing between two clamping faces 29 arranged in an opposing manner is limited by a clamping jaw 27 of the upper spring element 21 resting on a jaw 27 of the lower spring element 22.

In the displacement position it is correspondingly possible for the climbing aid 19 to be displaced along the holding element 16. The climbing aid 19 is correspondingly steplessly height-adjustable on the holding element 16. In order to allow a user a positioning aid in the arrangement of a climbing aid 19, visual position marks may be provided accordingly on the holding element 16 at regular intervals. It is also possible for the holding element 16 to accordingly have projections or notches, on which the climbing aid 19 can latch upon displacement in the displacement position. As a result, it is also made possible for a user, upon an actuation of the plant arrangement 1 according to the invention, to make possible a regularly spaced arrangement of the climbing aids 19 on the holding elements 16. Since the plant arrangement 1 according to the invention has a climbing aid 19 with precisely two spring units 20, a user can actuate a spring unit 20 with one respective hand and therefore independently and particularly easily assemble and use the plant arrangement 1.

The plant arrangement 1, i.e. the base body 2, the holding elements 16, the climbing aids 19 and the plant pots 32, are made of plastics material and preferably produced by injection moulding.

What is claimed is:

1. A plant arrangement for plants, wherein the plant arrangement comprises
   a. a base body surrounding an interior with at least one plant pot receptacle,
   b. a plant pot arranged in the at least one plant pot receptacle with
      i. a plant pot interior surrounded by the plant pot for receiving a plant and
      ii. a plant pot opening for inserting the plant in the plant pot interior,
   c. at least one substantially vertically extending holding element, which is fastened to the base body, and
   d. at least one substantially horizontally extending climbing aid for the plant,
   e. wherein the at least one climbing aid has a spring unit, which can be transferred by actuation from a fastening position into a displacement position,
   f. wherein the at least one climbing aid is clamped on the holding element in the non-actuated fastening position of the spring unit, and
   g. wherein the at least one climbing aid is displaceable along the holding element in the actuated displacement position of the spring unit.

2. A plant arrangement according to claim 1, wherein the spring unit comprises two spring elements each having an insertion opening, the insertion openings being arranged spaced apart from one another.

3. A plant arrangement according to claim 2, wherein the spring elements are connected to one another rigidly at their ends.

4. A plant arrangement according to claim 2, wherein the spring elements are connected to one another rigidly in one piece at their ends.

5. A plant arrangement according to claim 2, wherein the spring unit is elliptical.

6. A plant arrangement according to claim 2, wherein the spring unit is actuatable by pressing together of the spring elements.

7. A plant arrangement according to claim 2, wherein the spring unit is actuatable by resilient deformation of the spring elements.

8. A Plant arrangement according to claim 1, wherein the climbing aid has at least one clamping jaw, which has a clamping face, for clamping onto the holding element.

9. A plant arrangement according to claim 8, wherein the clamping face rests on the holding element in the fastening position of the spring unit and is arranged spaced apart from the holding element in the displacement position.

10. A plant arrangement according to claim 1, wherein the climbing aid is steplessly height-adjustable on the holding element.

11. A plant arrangement according to claim 1, wherein the holding element is fastened to the base body in a clamping device.

12. A plant arrangement according to claim 1, wherein the base body has at least one separating web for separating two adjacent plant pot receptacles.

13. A plant arrangement according to claim 12, comprising a guide hole in the separating web for guiding the holding element.

14. A plant arrangement according to claim 1, comprising a tube as a holding element.

15. A plant arrangement according to claim 1, comprising one of the group of a plurality of tube portions, which are connectable by a plug connection, and a telescopic tube.

16. A plant arrangement according to claim 1, comprising a climbing aid, which comprises a plurality of climbing elements, which are connectable to one another.

17. A plant arrangement according to claim 1, comprising a climbing aid, which comprises a plurality of climbing elements, which are connectable to one another by a latching connection.

18. A plant arrangement according to claim 1, comprising three plant pots and holding elements respectively arranged between two adjacent plant pots.

* * * * *